United States Patent [19]

Graf

[11] Patent Number: 5,598,901
[45] Date of Patent: Feb. 4, 1997

[54] AUTOMATIC LUBRICANT DISPENSER

[75] Inventor: Walter Graf, Euerdorf, Germany

[73] Assignee: Satzinger GmbH & Co., Euerdorf, Germany

[21] Appl. No.: 576,807

[22] Filed: Dec. 21, 1995

[30] Foreign Application Priority Data

Dec. 28, 1994 [DE] Germany .................. 44 46 463.0

[51] Int. Cl.$^6$ ..................................................... F16N 11/10
[52] U.S. Cl. ........................... 184/39; 184/108; 222/389; 222/399
[58] Field of Search ................ 184/39, 108; 222/389, 222/399

[56] References Cited

U.S. PATENT DOCUMENTS

| | | | |
|---|---|---|---|
| 3,430,731 | 3/1969 | Satzinger | 184/39 |
| 3,842,939 | 10/1974 | Satzinger | 184/39 |
| 4,023,648 | 5/1977 | Orlitzky et al. | 184/39 |
| 4,671,386 | 6/1987 | Orlitzky | 184/39 |
| 4,744,442 | 5/1988 | Bras et al. | 184/39 |
| 5,249,645 | 10/1993 | Wiklund | 184/39 |
| 5,386,883 | 2/1995 | Graf . | |
| 5,404,966 | 4/1995 | Yang | 184/39 |

FOREIGN PATENT DOCUMENTS

4446463C1  2/1996  Germany .

Primary Examiner—Thomas E. Denion
Attorney, Agent, or Firm—Herbert Dubno; Andrew Wilford

[57] ABSTRACT

An automatic pressurizable lubricant dispenser has a vessel adapted to hold a supply of a fluent lubricant and having one side formed with an outlet adapted to be connected to a machine to be lubricated, a cover, and a cap fittable like a piston in the vessel and forming with the cover a substantially closed compartment holding a supply of a reactive liquid. The cover is formed with a seat opening into the compartment and extending along an axis and a removable partition closes the seat and segregates it from the liquid-holding compartment. A cartridge body fittable in the seat is movable therein between a partially inserted position and a fully inserted position and is formed unitarily of plastic with a cylindrical collar formed with a pair of diametrally opposite cutouts and having an outer end. The outer end moves from nonengagement with the partition in the partially inserted position to engagement through the partition in the fully inserted position. An element capable of reacting with the liquid and forming a gas is held by respective arms on the cartridge pivotal on the collar in the cutouts between holding and releasing positions. The arms each have an outer end formed with an inwardly directed retaining formation engaging the reactive element and holding same in the collar only in the holding position and an inner end engageable outwardly with the seat to pivot the respective outer end into the releasing position on movement of the body into the fully inserted position.

4 Claims, 3 Drawing Sheets

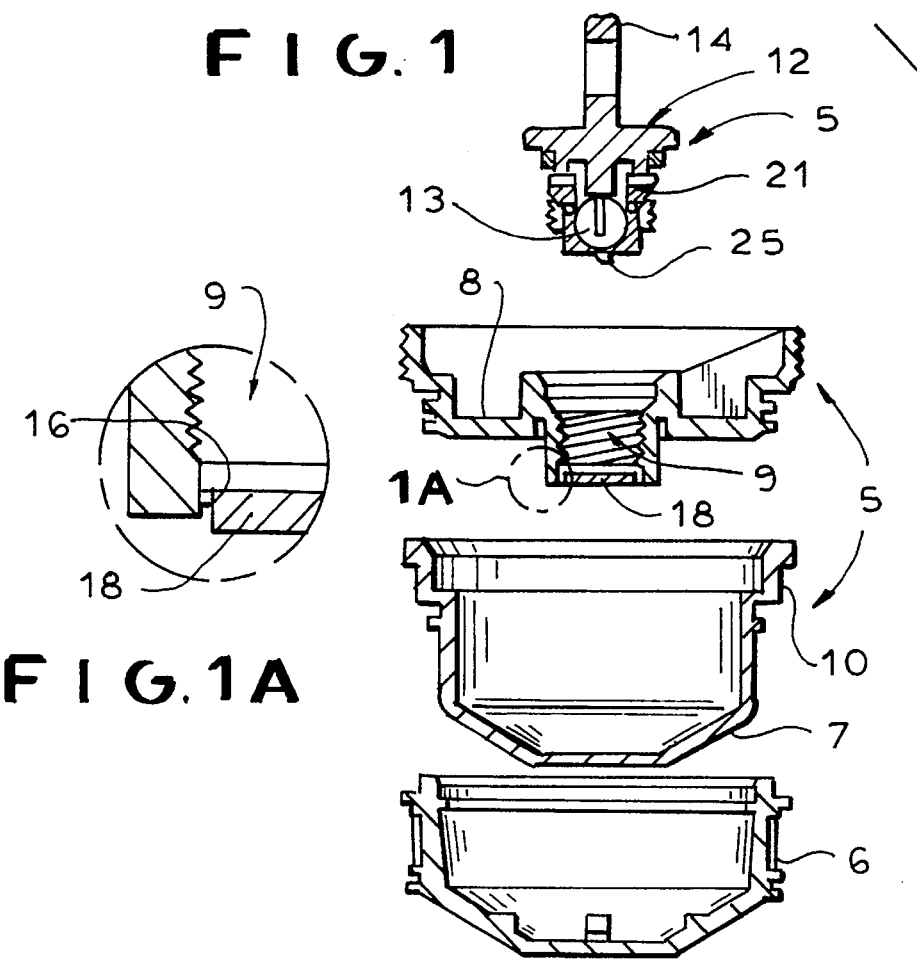
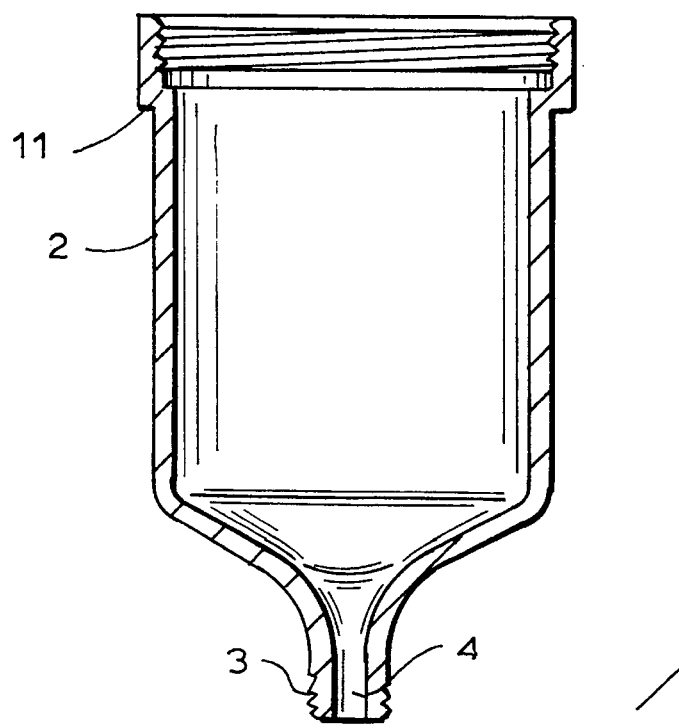

AUTOMATIC LUBRICANT DISPENSER

FIELD OF THE INVENTION

The present invention relates to an automatic lubricant dispenser. More particularly this invention concerns a device which automatically dispenses a liquid lubricant under pressure.

BACKGROUND OF THE INVENTION

In commonly owned U.S. Pat. No. 5,386,883 a lubricant dispenser is described having a vessel adapted to hold a supply of a fluent lubricant and having one side formed with an outlet adapted to be connected via a conduit to a machine to be lubricated and another open side and a cover engaged over the other side and fitted with a cap fittable snugly like a piston in the vessel and forming with the cover a substantially closed compartment holding a supply of a reactive liquid. The cover is formed with a seat opening into the compartment. A gas-generating cartridge fits the seat and has an element or capsule capable of reacting with the liquid and forming a gas. A removable partition closes the seat and segregates it from the liquid-holding compartment. The cartridge is constructed so as to remove the partition and contact the element with the liquid for generating gas in the compartment and forcing the cap like a piston away from the cover into the vessel to pressurize the fluent lubricant therein. The pressurized lubricant flows along a conduit to a machine needing it.

Such a system is very efficient, but occasionally the reactive capsule, typically an active alloy, can hang up in the cell formed by the cartridge and cap. The device must be tapped to get it to drop and start the lubricant-feeding reaction.

OBJECTS OF THE INVENTION

It is therefore an object of the present invention to provide an improved automatic lubricant dispenser.

Another object is the provision of such an improved automatic lubricant dispenser which overcomes the above-given disadvantages, that is which is of simple construction but which operates very surely, in particular with respect to dropping the reactive capsule into the electrolyte liquid.

SUMMARY OF THE INVENTION

An automatic pressurizable lubricant dispenser has according to the invention a vessel adapted to hold a supply of a fluent lubricant and having one side formed with an outlet adapted to be connected to a machine to be lubricated and another open side, a cover engaged over the other side, and a cap fittable like a piston in the vessel and forming with the cover a substantially closed compartment holding a supply of a reactive liquid. The cover is formed with a seat opening into the compartment and extending along an axis and a removable partition closes the seat and segregates it from the liquid-holding compartment. A cartridge body fittable in the seat is movable therein between a partially inserted position and a fully inserted position and is formed unitarily of plastic with a cylindrical collar formed with a pair of diametrally opposite cutouts and having an outer end. The outer end moves from nonengagement with the partition in the partially inserted position to engagement through the partition in the fully inserted position. An element capable of reacting with the liquid and forming a gas is held by respective arms on the cartridge pivotal on the collar in the cutouts between holding and releasing positions. The arms each have an outer end formed with an inwardly directed retaining formation engaging the reactive element and holding same in the collar only in the holding position and an inner end engageable outwardly with the seat to pivot the respective outer end into the releasing position on movement of the body into the fully inserted position so that when the body is moved from the partially to the fully inserted position the collar breaks out the partition and the arms pivot back to release the element so same contacts the liquid for generating gas in the compartment and forces the cap like a piston away from the cover into the vessel to pressurize the fluent lubricant therein.

Thus according to the invention the functions of releasing the reactive body or capsule and breaking through the frangible partition are separated, greatly simplifying the structure of the device. This makes it possible to form the cartridge body, levers, and their pivot all of a single unitary piece of plastic, again greatly reducing costs.

According to another feature of the invention the element is formed as a short cylinder centered on an axis generally perpendicular to the seat axis and having a pair of flat end faces. The seat is provided with guides engaging the flat end faces.

BRIEF DESCRIPTION OF THE DRAWING

The above and other objects, features, and advantages will become more readily apparent from the following description, reference being made to the accompanying drawing in which:

FIG. 1 is an exploded view of the dispenser according to the invention;

FIG. 1A is a large-scale view of the detail indicated at IA in FIG. 1;

SPECIFIC DESCRIPTION

Figure 2:
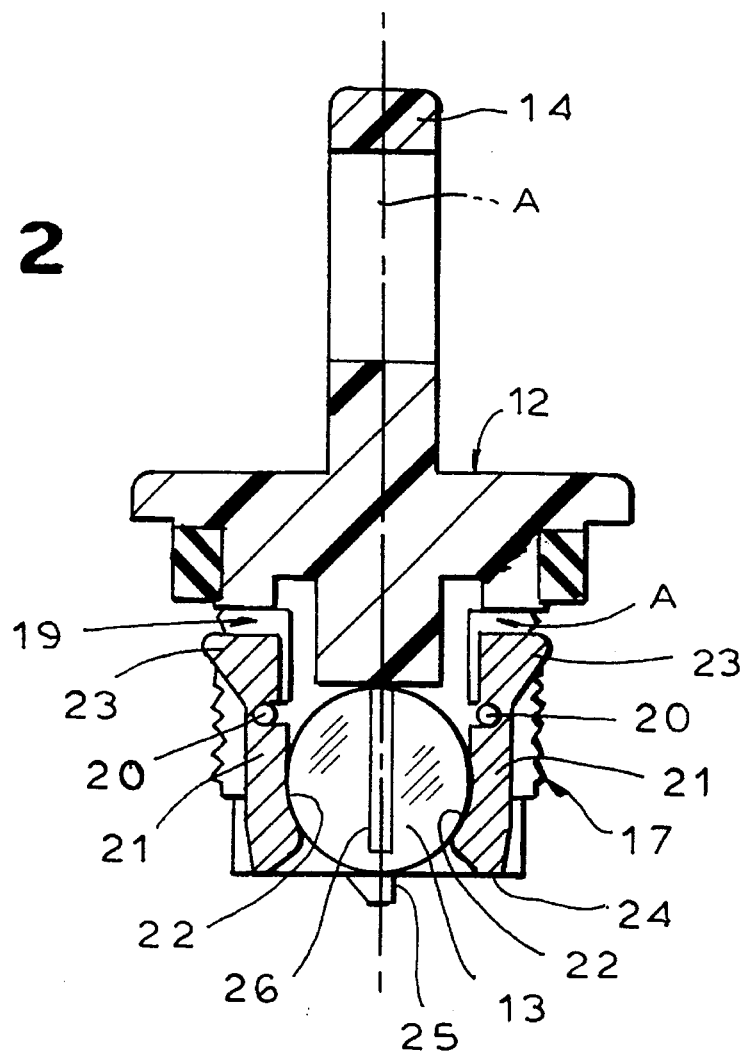
FIG. 2 is a large-scale view in axial section of the activating cartridge of FIG. 1.
Figure 3:
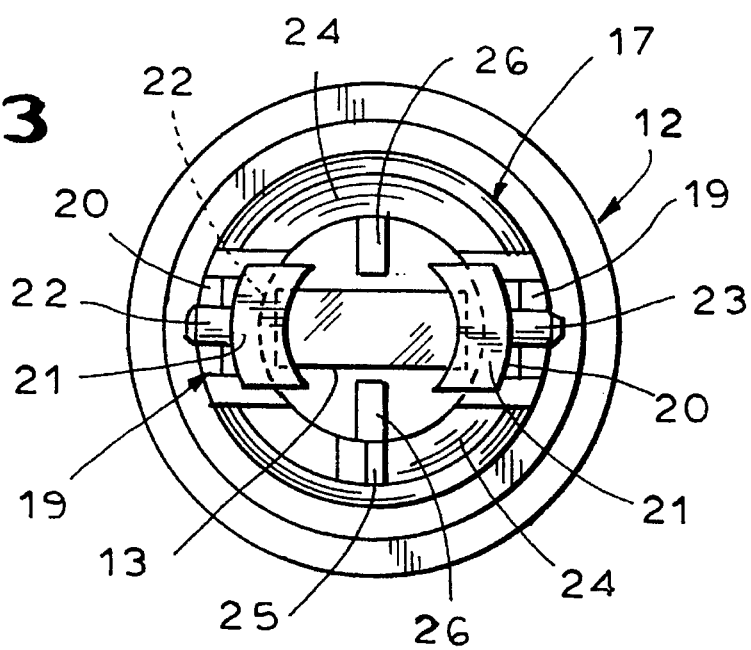
FIG. 3 is a bottom view of the structure of FIG. 2.
Figure 4:
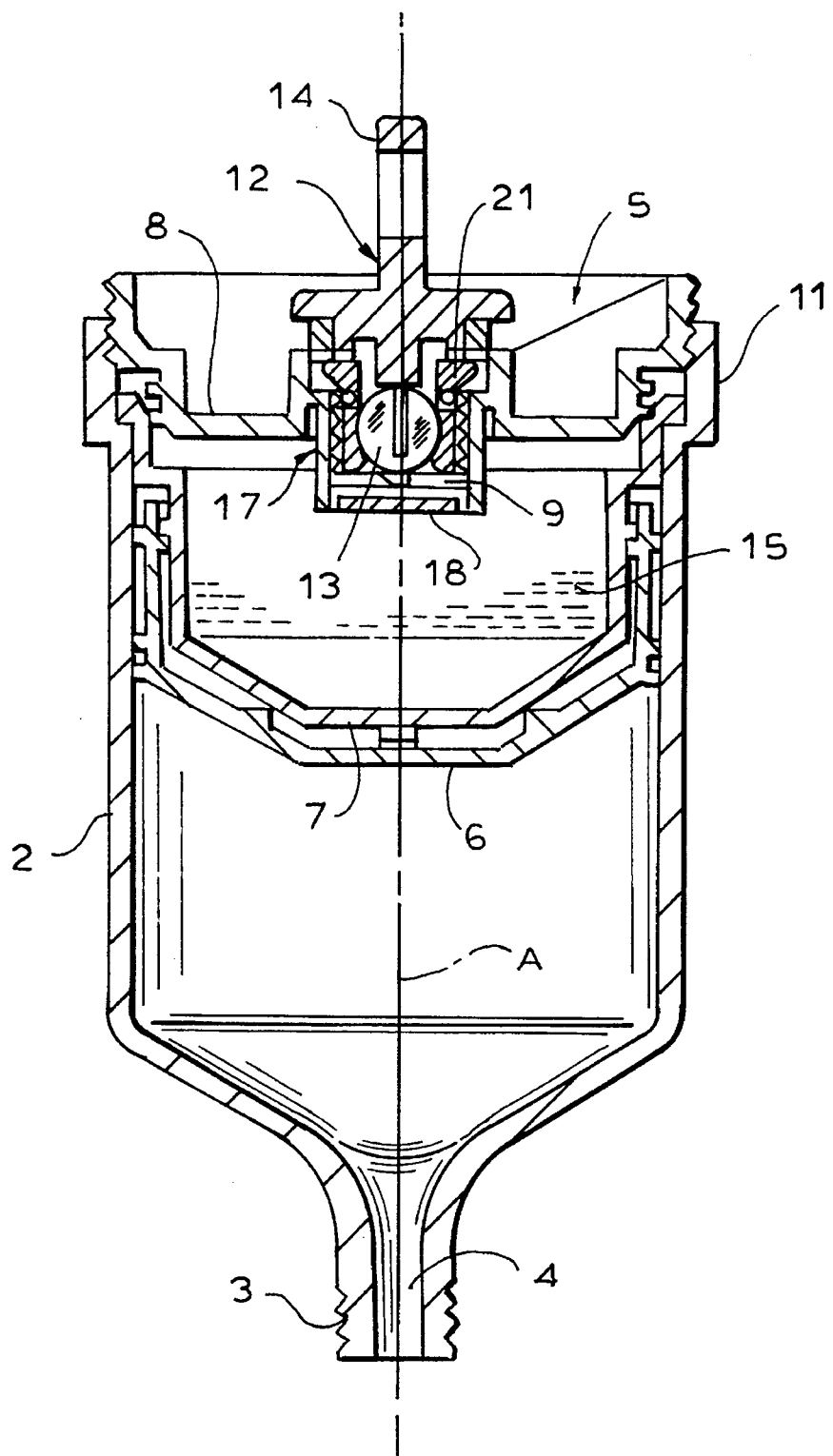
FIG. 4 is an axial section through the assembled dispenser.

As seen in FIGS. 1 through 4 the lubricant dispenser 1 according to the invention comprises a basically cylindrical vessel or container 2 centered on a normally upright axis A and having a lower end formed as an outlet nipple 3 defining an outlet opening 4 and normally connected via a conduit to a machine to be lubricated. The container 2 has an open upper end 11 formed with an internal screwthread into which is threaded a top wall or cover 8 that forms part of a gas-generating cell 5. This cell 5 is downwardly closed as shown in FIG. 1A by a removable partition 18 and has a central threaded hole or seat 9 into which fits a gas-generating cartridge 12 provided with an external screwthread for holding it in place. An elastomeric cup-shaped cap 10 fits against a radially outwardly projecting annular ridge formed on an edge of the cover 8 and has an elastically deformable end wall 7 that engages inside a cup-shaped piston 6 that can slide down in the container 2.

The cartridge 12 is provided with a capsule 13 which, when contacted with a body 15 of liquid contained in a chamber between the cover 8 and cap 10, generates gas in a manner well known in the art. This cartridge 12 has a body 17 formed with a finger-grip handle 14 and with a cylindrical side wall or collar 24 centered on the axis and formed with a pair of diametrally opposite, radially throughgoing, and axially downwardly open gaps 19 each accommodating a respective holder lever 21.

Each such holder lever 21 has at its lower end an inwardly directed formation 22 adapted to grip the capsule 13, an outwardly directed upper portion 23 that radially outwardly engages the inner wall of the seat 2 when the cartridge 12 is in place, and a central pivot 20 on which the lever 21 can pivot about an axis tangential or secantal to the axis A. The levers 21 may be formed integrally of plastic with the body 17 and with the pivots 20. The lower end of the body 17 is formed with a tooth 25 that is adapted to engage the frangible lower end wall 18 (FIG. 1A) of the seat 9, breaking it free therefrom. To this end an annular weakening groove 16 is formed around the bottom wall 18 to facilitate its removal. Each lever 21 is formed with a radially inwardly open secantal groove in which sits the respective secantally extending pivot pin 20, which may be unitary with the body 17 and/or with the lever 21.

The capsule 13 is a short cylinder, that is coin shaped, with its axis perpendicular to the axis A and is held between guide ridges 26 formed on the inside surface of the body 17.

The dispenser 1 is delivered to the user with the cartridge 12 separate. Once it is connected at 3 to the machine to be lubricated and is filled, the user screws the cartridge 12 down into the seat 9, causing two things to happen: The levers 21 are pivoted out as their bumps 23 engage the inner surface of the seat 9 so that the formations 22 move out and allow the capsule 13 to drop and the tooth 25 and lower edges of the collar 24 engage the wall 18, breaking same out. This causes the capsule 13 to drop into the body 15 of liquid and generate gas, making the rubber end wall 7 bulge downward to force the piston 6 down, driving lubricant under pressure from the outlet 4.

I claim:

1. An automatic pressurizable lubricant dispenser comprising:

a vessel adapted to hold a supply of a fluent lubricant and having one side formed with an outlet adapted to be connected to a machine to be lubricated and another open side;

a cover engaged over the other side;

a cap fittable like a piston in the vessel and forming with the cover a substantially closed compartment holding a supply of a reactive liquid, the cover being formed with a seat opening into the compartment and extending along an axis;

a removable partition closing the seat and segregating it from the liquid-holding compartment; and a cartridge body fittable in the seat and movable therein between a partially inserted position and a fully inserted position and formed unitarily of plastic with a cylindrical collar formed with a pair of diametrally opposite cutouts and having an outer end, the outer end moving from nonengagement with the partition in the partially inserted position to engagement through the partition in the fully inserted position;

an element capable of reacting with the liquid and forming a gas;

respective arms on the cartridge pivotal on the collar in the cutouts between holding and releasing positions, the arms each having an outer end formed with an inwardly directed retaining formation engaging the reactive element and holding same in the collar only in the holding position and an inner end engageable outwardly with the seat to pivot the respective outer end into the releasing position on movement of the body into the fully inserted position, whereby when the body is moved from the partially to the fully inserted position the collar breaks out the partition and the arms pivot back to release the element so same contacts the liquid for generating gas in the compartment and forces the cap like a piston away from the cover into the vessel to pressurize the fluent lubricant therein.

2. The automatic lubricant dispenser defined in claim 1 wherein the element is formed as a short cylinder centered on an axis generally perpendicular to the seat axis and having a pair of flat end faces, the seat being provided with guides engaging the flat end faces.

3. The automatic lubricant dispenser defined in claim 1 wherein the body and arms are unitarily formed of plastic.

4. The automatic lubricant dispenser defined in claim 1 wherein the partition is unitarily formed with the cap.

* * * * *